Jan. 27, 1970

P. H. LEFFMANN 3,492,586

CONTROL APPARATUS

Filed Sept. 22, 1966

INVENTOR
PAUL H. LEFFMANN

BY [signature]

ATTORNEY

United States Patent Office 3,492,586

Patented Jan. 27, 1970

3,492,586

CONTROL APPARATUS

Paul H. Leffmann, Scottsdale, Ariz., assignor to Honeywell Inc., Minneapolis, Minn., a corporation of Delaware Filed Sept. 22, 1966, Ser. No. 581,202

Int. Cl. G01k 7/00

U.S. Cl. 328—3 9 Claims

ABSTRACT OF THE DISCLOSURE

This invention relates generally to electrical apparatus, more particularly to electrical apparatus which delays pulses, and more specifically to electrical apparatus which is associated with a novel analog device in order to produce a time delay from input to output whose duration is determined by the analog device.

Background of the invention

This invention resulted from the need for a device which would provide an output pulse which could be delayed in time in accordance with a characteristic of a mechanical device. Specifically, it was desired to have a pulse output delayed in time in accordance with the reaction of the mechanical device to a heat input. It was found that the reaction of the given mechanical device to a heat input was substantially the same as the response of a two stage, R-C, low pass, or two lag electric circuit would be to a step input of voltage. Therefore, the idea was conceived of using a two lag thermal analog of the mechanical device in question to provide the information necessary to determine the desired pulse delay. Each time there is a heat input to the given mechanical device, a heat input is provided to the thermal analog, so that the reaction of the thermal analog to heat passing through it represents the reaction of the mechanical device to the heat input.

Description of the invention

It is an object of this invention to provide new and novel electrical apparatus whose output includes one or more parameters which vary in time in response to information gained from an analog device and to provide the analog device.

Further objects and advantages will become apparent from the reading of the specification and claims in conjunction with the drawings wherein:

Figure 1:
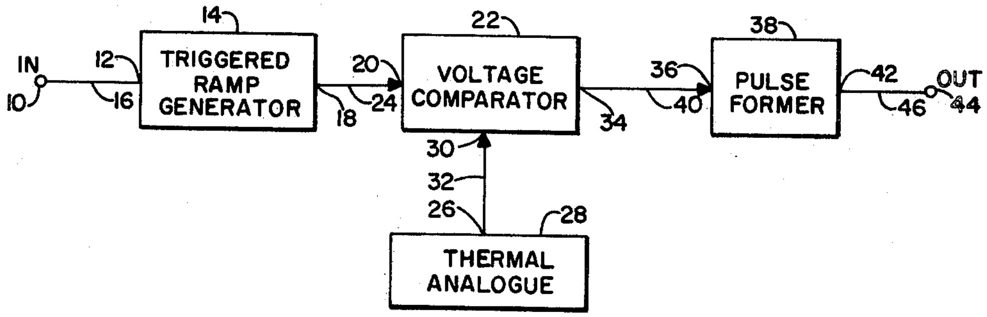
FIGURE 1 shows a preferred embodiment of the present invention.

In FIGURE 1 an input terminal 10 is connected to the input 12 of a triggered ramp generator 14 through a connection 16. The output 18 of generator 14 is connected to one input 20 of a voltage comparator 22 through a connection 24. The output 26 of a thermal analog 28 is connected to another input 30 of comparator 22 through a connection 32. The output 34 of comparator 22 is connected to the input 36 of a pulse former 38 through a connection 40. The output 42 of pulse former 38 is connected to an output terminal 44 through a connection 46.

Figure 2:
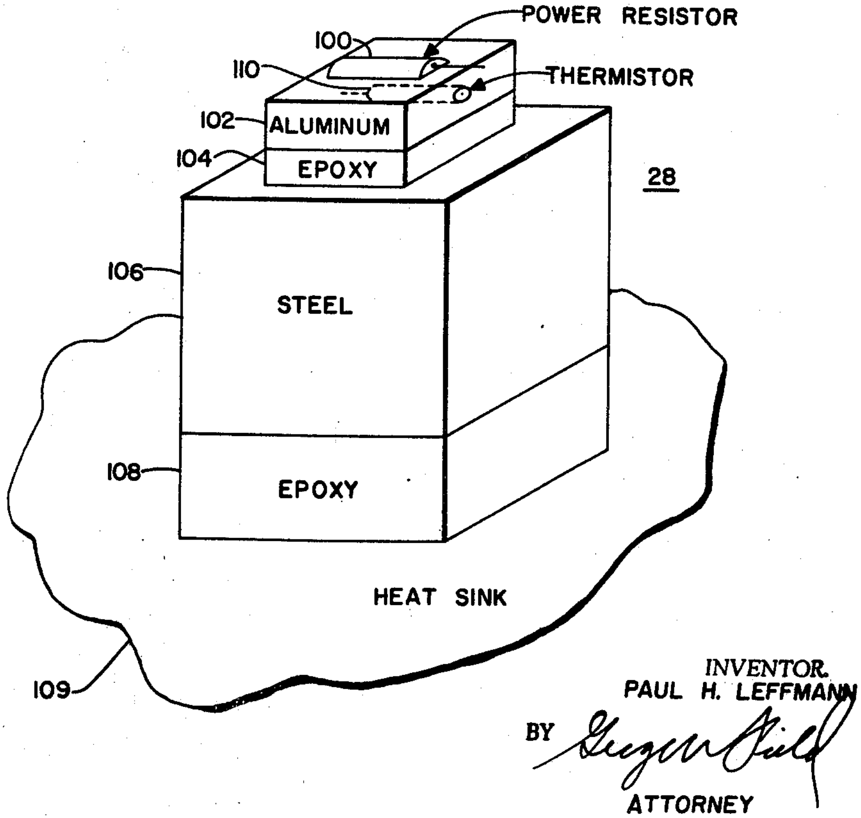
FIGURE 2 shows an embodiment of a thermal analog which is used in the apparatus of FIGURE 1 in the form of block 28.

In FIGURE 2 heating means in the form of a power resistor 100 is attached to one face of a first conducting means, an aluminum block 102, by means not shown, so that upon energization resistor 100 supplies heat to block 102 and thus acts as a heat source for the remainder of the apparatus of FIGURE 2. Another face of block 102 is attached in a thermally conducting relation to one face of a second heat conducting means, an epoxy block 104 which is aluminum powder filled so that it will conduct heat yet not have large heat storage capability. Epoxy block 104 functions as a thermal resistance while aluminum block 102 functions as a thermal capacitance since it has large capability for heat storage.

Another face of block 104 is connected in a thermally conducting relation to a third heat conducting means, a steel block 106, which like aluminum block 102 has large heat retaining capability and functions as a thermal capacitance in thermal analog 28. Another face of block 106 is connected in a thermally conducting relation to one face of a fourth heat conducting means, an epoxy block 108 which functions in the same manner as block 104. Another face of epoxy block 108 is connected in a thermally conducting relation to a heat sink 109 which insures that the flow of heat is through the blocks from top to bottom by remaining at a substantially constant temperature regardless of the heat input to the block. Without heat sink 109, dissipation of heat other than by conduction through the blocks might predominate and destroy the accuracy of the analog.

A thermistor 110 is embedded within aluminum block 102, in the preferred embodiment. As is well known to those skilled in the art a thermistor is a resistor whose resistance is dependent on its temperature. Thermistor 110 functions as a sensor in analog 28 by providing information as to how the analog reacts to a heat input provided by power resistor 100.

Operation of the invention

Generally the specific embodiment of the present invention shown in the drawings operates by comparing the value of an output provided by ramp generator 14 with an output provided by thermal analog 28 and providing a pulse output delayed in time with respect to a triggering input pulse depending upon when the value of the generator output exceeds the value of the thermal analog output. In the present embodiment, thermal analog 28 is a representation of the thermal characteristics of a given device. Thermal analog 28 is analogous to—i.e. acts like—the given device with respect to its reaction to heat while taking a form other than that of the given device.

With reference to FIGURE 1, when a trigger input is supplied to input terminal 10 it triggers ramp generator 14, which in turn supplies a ramp of voltage to input 20 of voltage comparator 22. Thermal analog 28 varies the DC voltage supplied to input 30 comparator 22 in a manner explained with reference to FIGURE 2. When the value of the ramp created by generator 14 becomes greater than the DC voltage supplied by thermal analog 28, a signal appears at output 34 of voltage comparator 22 and is supplied to pulse former 38, which then creates a pulse output delayed in time with respect to the trigger input by an amount which is dependent upon the voltage supplied by thermal analog 28.

With reference to FIGURE 2, power resistor 100 provides a source of heat which is conducted through the aluminum block 102, the first aluminum powder filled epoxy block 104, the steel block 106, the second aluminum powder filled epoxy block 108, and to heat sink 109. The manner of conduction of all of the blocks affects thermistor 110 whose resistance is determined by its temperature, as is well known to those skilled in the art. Thermistor 10, by changing its resistance in response to temperature, the output of a voltage divider, not shown, which causes a change in a DC voltage which is then compared to the output of triggered ramp generator 14, in the preferred embodiment. Any desired delay for a given temperature can be set up by properly adjusting the voltage divider network.

It was found that the device to be analogized reacted to a step input of temperature in much the same fashion as a two stage R-C, low pass, electrical lag circuit reacts to a step input in voltage. The analog was then constructed on this basis. Thermal block 102 is a thermal analog of a capacitor. Epoxy block 104 is a thermal equivalent of a resistor. Steel block 106 is again a thermal analog of a capacitor. Second epoxy block 108 is again a thermal analog of a resistor. Thus, the embodiment shown in FIGURE 2 represents a two stage R-C circuit. The parameters of the various blocks used—such as thermal conductivity, specific heat, and dimensions—are chosen as would be values of resistance and capacitance in an R-C circuit in which a given response to a step function input of voltage is desired. In a like manner, the value of the current which is caused to flow through power resistor 100 for heating must be chosen as would the value of the step input to an electrical analog.

Since it is desired that the pulses be delayed by an amount proportional to the reaction of a mechanical device to a heat input, it is seen that an input representative of heat must be supplied to the thermal analog at the same time heat is supplied to the mechanical device. Therefore, each time there is a heat input to the mechanical device a current is caused to flow through power resistor 100 which causes a corresponding heat input to thermal analog 28. It will be realized by those skilled in the art that the thermal analog corresponds to the mechanical device while the analog is cooling as well as while the analog is heating. Thus, for an influx or reduction in heat seen by thermal analog 28 an output is provided which indicates the reaction of the mechanical device to a corresponding influx or reduction in heat.

It will be obvious to those skilled in the art that various types of triggered ramp generators may be used. Any circuit which has a ramp output beginning at a time a trigger signal appears will suffice. It will also be obvious to those skilled in the art that it is not always necessary to use a triggered ramp generator. The particular use to which the circuit is put may require an astable or free running ramp generator or some other time dependent signal means and not a monostable or triggered ramp generator. It will also be obvious to those skilled in the art that voltage comparator 22 may be simply a differential amplifier circuit or any circuit which compares two voltages and yields an output when one input exceeds the other input or when the two inputs have a predetermined relationship, not necessarily equality. It will again be obvious to those skilled in the art that many different types of logic arrangements may be conceived which receive an output from a comparator and create a pulse output. Various versions of the thermal analog circuit will also be obvious to those skilled in the art since the exact sizes and materials used will vary with the device and the parameter to be analogized.

Power supplies which are not shown may be necessary to provide power to some of the blocks.

Other alterations and variations will be obvious to those skilled in the art. My invention is defined in the following claims in which I intend to cover all modifications which do not depart from the spirit or scope of this invention.

I claim:

1. Apparatus for giving an output representative of change in a selected condition responsive characteristic of a mechanical device comprising:

means including a triggered ramp generator, a voltage comparator and a pulse former for giving an output which varies in accordance with an input signal;

thermal analog means connected to the first named means for giving an input signal thereto which varies with change in a stimulus signal, in the same way that said characteristic of said device changes with change in the condition; and means supplying a stimulus signal to said thermal analog means which is analogous to and coterminous with each change in said condition; so that the output is the delay between a pulse triggering said ramp generator and the resulting pulse from said pulse former.

2. A thermal analog of a parameter which varies as a known function of time comprising, in combination:

a variable heat source;

a heat sink;

a plurality of members having as characteristics their physical dimensions, heat conductivities, and specific heats;

means mounting said members in sequential heat transfer relation to complete a path for heat flow from said source to said sink, in such a way that no two adjoining members have the same combination of characteristics; and means, in direct heat transfer relation to only one of said members at a location between said source and said sink, for giving an output in accordance with the temperature thereof, the characteristics of the several members being so chosen that a change in the heat supplied by said source results in variation in the output of the last named means as a function of time which is the same as that of said parameter.

3. Apparatus according to claim 2 in which one of the members is of aluminum.

4. Apparatus according to claim 2 in which one of the members is of epoxy resin filled with aluminum powder.

5. Apparatus according to claim 2 in which said members are alternately first of good conductivity and high specific heat and then of less conductivity and lower specific heat.

6. Apparatus according to claim 2 in which said members are of at least two different sizes in terms of cross-sectional area normal to the heat flow path.

7. Apparatus according to claim 2 in which the last named means and the heat source are in direct heat transfer relation to the same member.

8. Apparatus according to claim 2 in which the members between said source and said sink are seriatim of aluminum plastic, steel, and plastic.

9. Apparatus according to claim 7 in which the first and second members are of aluminum and aluminum filled epoxy resin respectively and are of the same cross-sectional area, and in which the third and fourth members are of steel and aluminum filled epoxy resin respectively, and are of greater cross-sectional area than the first and second members.

References Cited

UNITED STATES PATENTS

| | | | |
|---|---|---|---|
| 2,552,480 | 5/1951 | Dickey | 328—3 |
| 2,673,917 | 3/1954 | Woodling | 328—3 |
| 2,731,564 | 1/1956 | Edlestein | 328—3 |
| 2,795,697 | 6/1957 | Nagel | 328—3 |
| 2,874,906 | 2/1959 | Nossen | 235—151.1 |
| 3,101,433 | 8/1963 | Miller et al. | 328—3 |

DONALD D. FORRER, Primary Examiner

H. A. DIXON, Assistant Examiner

U.S. Cl. X.R.

307—228, 229, 310; 328—146